(12) United States Patent
Nakajima

(10) Patent No.: US 8,477,319 B2
(45) Date of Patent: Jul. 2, 2013

(54) MEASURING APPARATUS

(75) Inventor: Ryusuke Nakajima, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 218 days.

(21) Appl. No.: 12/874,279

(22) Filed: Sep. 2, 2010

(65) Prior Publication Data

US 2011/0058183 A1 Mar. 10, 2011

(30) Foreign Application Priority Data

Sep. 8, 2009 (JP) ................................. 2009-207018

(51) Int. Cl.
*G01B 11/24* (2006.01)
(52) U.S. Cl.
USPC ......................................... 356/601; 356/625
(58) Field of Classification Search
USPC .................................. 356/601–640
See application file for complete search history.

(56) References Cited

U.S. PATENT DOCUMENTS 5,126,872 A * 6/1992 Birkle ......................... 359/196.1
5,455,677 A 10/1995 Yoshizumi et al.
6,646,750 B1 * 11/2003 Christoph .................... 356/609

FOREIGN PATENT DOCUMENTS

JP 06-265340 A 9/1994
JP 2004-012244 A 1/2004

* cited by examiner

*Primary Examiner* — Tara S Pajoohi Gomez
(74) *Attorney, Agent, or Firm* — Fitzpatrick, Cella, Harper & Scinto

(57) ABSTRACT

A measuring apparatus for measuring a three-dimensional shape includes a light source, a contact tip that is brought into contact with an object to be measured and scans the object to be measured, a holding portion that is movable along the object to be measured, a coupling portion for coupling the contact tip to the holding portion via a flexible support member, and an objective lens supported by the holding portion. In addition, an optical system condenses light provided by the light source on the contact tip via the objective lens, a photodetector receives backscattered light from the contact tip and detects a position of the contact tip that is brought into contact with the object to be measured, a moving unit moves the holding portion, and a position measuring instrument measures a position of the holding portion. The measuring apparatus measures the three-dimensional shape by measuring the position of the holding portion while scanning the object to be measured with the contact tip that is brought into contact with the object to be measured, and the contact tip is provided with a film for reflecting the light condensed thereon.

9 Claims, 2 Drawing Sheets

MEASURING APPARATUS

BACKGROUND OF THE INVENTION

1. Field of the Invention

The present invention relates to a contact type measuring apparatus including a measuring probe having a contact tip provided at a tip end portion thereof, which is brought into contact with a surface of an object to be measured, to thereby measure a three-dimensional shape.

2. Description of the Related Art

As a three-dimensional shape measuring method of obtaining data on coordinates and a shape of a surface of an object to be measured that has a three-dimensional structure, there is known a measuring method in which a probe is moved along the surface of the object to be measured while being in pressure-contact with the surface of the object to be measured by a predetermined contact force, to thereby measure a surface shape of the object to be measured based on a moving position of the probe.

In the conventional three-dimensional shape measuring method, as disclosed in Japanese Patent Application Laid-Open No. H06-265340, an air bearing is employed so that a probe shaft is provided so as to be movable in a vertical direction, to thereby allow the probe to support its own weight via a spring. With this configuration, the measurement may be performed with a minimum contact force, which prevents the object to be measured from being damaged by a weight applied along with the measurement or from being displaced from the mounted position.

However, according to the configuration disclosed in Japanese Patent Application Laid-Open No. H06-265340, there is a limit in reducing the contact force for pressing the probe against the object to be measured. In view of this, as disclosed in Japanese Patent Application Laid-Open No. 2004-012244, there is a method of measuring a shape of a microfabricated object to be measured by using a probe which employs, as a contact tip, a fine particle trapped by an optical radiation pressure of a laser beam, without through a shaft which is a rigid body.

The laser beam, which is condensed by a condensing lens and applied to the fine particle, is reflected and refracted at an interface between the fine particle and outside air, and therefore generates an optical radiation pressure. The optical radiation pressure thus generated results in a resultant force (trapping force) in a vertically upward direction that is equal to or larger than the self weight of the fine particle, and the resultant force acts on the fine particle, to thereby hold the fine particle. As described above, the fine particle held by the optical radiation pressure is used as the contact tip, to thereby realize a contact force on the order of $10^{-5}$ N.

The method disclosed in Japanese Patent Application Laid-Open No. 2004-012244 may be effective at reducing the contact force. However, it is necessary to first trap the fine particle that is provided in advance as the contact tip, before starting measurement.

Further, in order to generate the resultant force in a vertically upward direction which exceeds the self weight of the fine particle by using the optical radiation pressure, it is necessary to condense light on the fine particle at a large angle with respect to an optical axis of the detection optical system. Accordingly, when measuring a rectangular groove shape, the object to be measured blocks light that should be applied to the fine particle, with the result that the fine particle may not be held by the optical radiation pressure.

Further, the fine particle is assumed to be transparent and spherical, and hence illuminating light passes through the fine particle and leaks therefrom. The transmitted light reaches the object to be measured and is reflected when the fine particle is brought closer to the object to be measured. As a result, the illuminating light and the reflected light interfere with each other to change the optical radiation pressure, which leads to measurement error.

SUMMARY OF THE INVENTION

It is an object of the present invention to provide a measuring apparatus capable of performing highly accurate and stable geometry measurement even when measuring a side surface and a groove shape portion of an object to be measured, without the need to trap, for every measurement, a contact tip which uses an optical radiation pressure.

In order to achieve the above-mentioned object, a measuring apparatus for measuring a three-dimensional shape according to the present invention includes: a contact tip that is brought into contact with an object to be measured and scans the object to be measured, a holding portion that is movable along the object to be measured, a coupling portion for coupling the contact tip to the holding portion via a flexible support member, an objective lens supported by the holding portion, an optical system for condensing light on the contact tip via the objective lens, a photodetector for receiving backscattered light from the contact tip and detecting a position of the contact tip that is brought into contact with the object to be measured, a moving unit for moving the holding portion, and a position measuring instrument for measuring a position of the holding portion. The measuring apparatus measures the three-dimensional shape by measuring the position of the holding portion while scanning the object to be measured with the contact tip that is brought into contact with the object to be measured.

The contact tip is coupled to the holding portion via the flexible member restraining the contact tip and is subjected to a force in vertically upward direction exerted by the flexible member, which eliminates the need to support the self weight of the contact tip by the optical radiation pressure. Accordingly, light for generating the optical radiation pressure may be condensed on the contact tip at an angle in the vicinity of the optical axis of the detection optical system. For example, light is not blocked even in a case where the contact tip is brought into contact with a sidewall of a rectangular groove shape, which allows measurement of a more complicated three-dimensional shape.

When the contact tip is brought into contact with the object to be measured, the flexible member buckles (slackens). As a result, a force to be applied to the object to be measured due to the movement of the holding portion is reduced. Accordingly, as compared with a case where the contact tip is coupled to the holding portion via a shaft that has no flexibility, the contact force may be significantly reduced.

Further features of the present invention will become apparent from the following description of exemplary embodiments with reference to the attached drawings.

DESCRIPTION OF THE EMBODIMENTS

Embodiment 1

Figure 1:
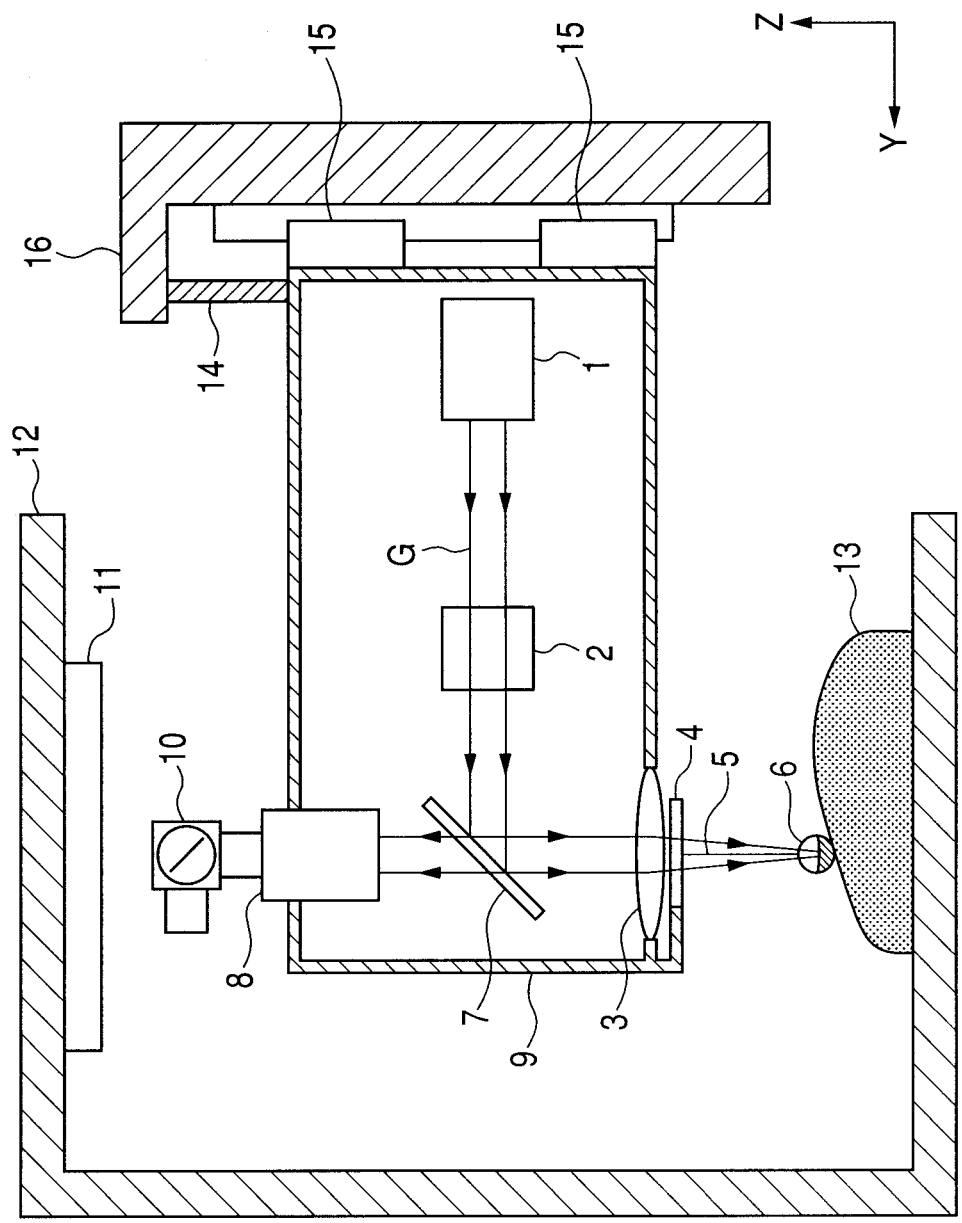
FIG. 1 is a schematic diagram illustrating a measuring apparatus according to a first embodiment of the present invention.

FIG. 1 illustrates a measuring apparatus according to a first embodiment of the present invention. The measuring apparatus includes an optical system which includes a light source (fiber laser) 1, an acousto-optical deflector 2 serving as an irradiation direction changer for changing the optical intensity and the irradiation direction of a laser beam G emitted from the light source 1, an objective lens 3 that is supported by a holding portion and condenses the laser beam G. The acousto-optical deflector 2 temporally vibrates the laser beam G.

A contact tip 6 is coupled to a coupling portion formed of a fixed member 4 for allowing the laser beam G to pass therethrough and a flexible support member 5. The contact tip 6 is spherical in shape, which is obtained by melting a tip end portion of a thin wire of quartz forming the flexible support member 5 and by forming the molten portion into a spherical shape using the surface tension thereof. The flexible support member 5 allows light from the optical system to pass therethrough. The contact tip 6, which is in a spherical shape, is brought into contact with an object to be measured 13 at a lower hemisphere thereof, and the lower hemisphere is subjected to reflective processing with a chromium film. A half mirror 7 reflects the laser beam G traveling from the light source 1 to fold the laser beam G toward the objective lens 3, while allowing backscattered light from the contact tip 6 to pass therethrough to a photodetector 8.

Displacement in a Z direction of the holding portion 9 supporting the objective lens 3 and the fixed member 4 which allows the laser beam G to pass therethrough is measured by an interferometer 10 serving as a position measuring instrument for measuring the position of the holding portion 9. The interferometer 10 measures a distance to a reference mirror 11 serving as a reference position fixed to a frame 12, to thereby measure the displacement. The holding portion 9, which scans the object to be measured 13 along a surface thereof, is supported by guides 15 onto an XY table 16 serving as a moving unit, so as to be movable in the Z direction by a direct acting unit incorporating a ball screw 14 as a driving element. Further, the XY table 16 moves in an XY direction, to thereby move the prove main body 9 to scan in the XY direction. The configuration of the moving unit is not limited to the above-mentioned example, and may be determined as appropriate by the user of the device.

The laser beam G emitted from the light source 1 passes through the acousto-optical deflector 2 to be folded by the half mirror 7, and is condensed on a bottom surface of the contact tip 6 by the objective lens 3. At this time, the contact tip 6 moves by following a focal point of the laser beam G, under the influence of an optical radiation pressure applied by the laser beam G in a direction of a gravitational force. Accordingly, when the laser beam G is temporally deflected by the acousto-optical deflector 2 so that an irradiation point (focal point) is vibrated, the contact tip 6 may be vibrated in an arbitrary direction. For example, the laser beam G may be varied in intensity and irradiation direction so that the contact tip 6 may be vibrated in a vertical direction or in a horizontal direction, to thereby measure the surface and a groove shape portion of the object to be measured 13 and a side surface of the object to be measured 13, respectively, with high accuracy. In the manner as described above, when the measurement is performed with a known vibration being given to the contact tip 6, an influence of disturbances such as fluctuations in air may be discriminated, which allows the measurement to be performed with further high accuracy. It should be noted that an electro-optic device may be used in place of the acousto-optical deflector 2. The acousto-optical deflector 2 is not a necessity for the measuring apparatus according to the present invention in order to hold the contact tip 6 at a specific position by the flexible support member 5 and the optical radiation pressure applied by a laser beam irradiated. However, the acousto-optical deflector 2 is effective at reducing noise due to disturbances, and hence may be used as appropriate.

Backscattered light of the laser beam G reflected by the contact tip 6, which has been subjected to reflective processing, passes through the half mirror 7 via the objective lens 3, and is received by the photodetector 8. At this time, the incident intensity distribution of the backscattered light with respect to the photodetector 8 varies along with the movement of the contact tip 6, and hence the incident intensity distribution with respect to the photodetector 8 which varies at the same frequency as that of the vibration of the contact tip 6 may be obtained. A detection signal generated in the photodetector 8 may be subjected to lock-in detection by using a deflection frequency input to the acousto-optical deflector 2 as a reference frequency, so that optical detection may be performed excluding irrelevant information on items such as background light, other than information on the displacement of the contact tip 6.

When the contact tip 6 comes into contact with the object to be measured 13, the change in position is reflected in the distribution of the backscattered light of the laser beam G, and hence the contact between the contact tip 6 and the object to be measured 13 may be detected as a change in detection information (output) of the photodetector 8. The position of the holding portion 9 may be controlled according to the output from the photodetector 8 so that the contact tip 6 maintains a state which is attained immediately after the contact, to thereby maintain a constant distance between the holding portion 9 and the contact tip 6.

The XY table 16 is scanned in such a manner that the contact tip 6 may be brought into contact with the object to be measured 13 and copy the surface of the object to be measured 13 while maintaining a constant distance between the holding portion 9 and the contact tip 6, and variations in distance between the interferometer 10 and the reference mirror 11 are measured, to thereby measure the surface shape (three-dimensional shape) of the object to be measured 13.

According to the present invention, the optical radiation pressure is used to determine the position of the contact tip 6 supported by the flexible support member 5, which is significantly different from a conventional configuration in which the light irradiation pressure is used to support a fine particle serving as the contact tip. According to the first embodiment, the objective lens 3 condenses light with respect to the contact tip 6 so that the optical radiation pressure is generated to be applied to the contact tip 6, to thereby exert a force on the contact tip 6 in a direction separating away from the holding portion 9, so that the contact tip 6 may be disposed at a desired position with respect to the holding portion 9. Further, the contact tip 6 is coupled to the holding portion 9 via the flexible support member 5, and hence there is no fear of losing the contact tip 6. When the contact tip 6 is subjected to a force exerted by the optical radiation pressure in a direction separating away from the holding portion 9, the contact tip 6 is held at a constant position as being balanced with a tension force provided by the flexible support member 5. Further, the flexible support member 5 buckles (slackens) when the contact tip 6 is brought into contact with the object to be measured 13, to thereby reduce a force to be applied to the object to be measured 13 due to the motion of the holding portion 9.

The flexible support member 5 may be in any form as long as the member is formed of a flexible member capable of setting up limitations on the distance between the contact tip 6 and the holding portion 9 and buckles immediately when the contact tip 6 is brought into contact with the object to be measured 13 to exert a force on the flexible support member 5 in a compression direction. Further, it is preferred that the flexible support member 5 be formed of a material which allows light to pass therethrough.

Alternatively, a coupling unit having a high buckling coefficient may be provided between the holding portion 9 and the contact tip 6. For example, it is preferred that one end of the flexible support member 5 forming the coupling portion practically serve as a rotary end while the flexible support member 5 itself has a shape capable of buckling sufficiently under a desired contact force. Alternatively, at least one end of the flexible support member 5 may have a mechanism of allowing rotation.

The contact tip 6 is provided with a light reflective film (chromium film), so that the light to pass through the contact tip 6 may be blocked. With this configuration, unnecessary stray light, which is generated when light passing through the contact tip 6 is applied onto the surface of the object to be measured 13, may be reduced, and measurement error due to variations in optical radiation pressures caused by interference of the applied light with the stray light may be prevented from being caused.

A dichroic mirror or a half mirror may be additionally provided above the objective lens 3, to thereby form an epi-illumination which brings an advantage in detection. The epi-illumination uses light different in wavelength from the laser beam G. With the addition of this illuminating system, the object to be measured 13 may be illuminated with a light beam that is parallel to the contact tip 6, so that an image formed by the backscattered light of the illuminating light from the contact tip 6 may be detected two-dimensionally by a photodetector such as a charge coupled device (CCD) or an optical position sensing device.

Embodiment 2

Figure 2:
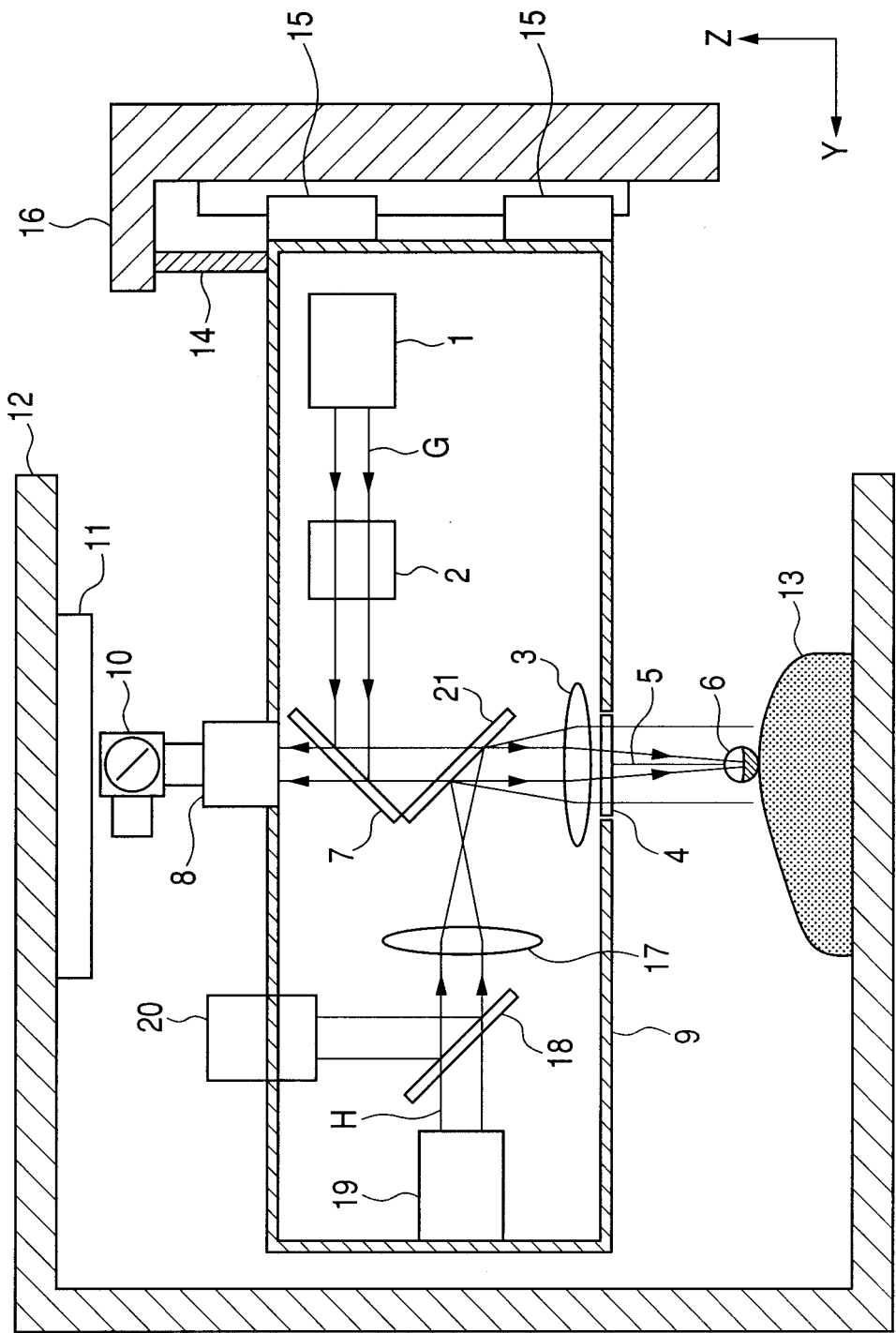
FIG. 2 is a schematic diagram illustrating a measuring apparatus according to a second embodiment of the present invention.

FIG. 2 illustrates a second embodiment of the present invention. According to the second embodiment, an illuminating light H, which is different in wavelength from the laser beam G of the first embodiment, is used to capture the displacement of the contact tip 6 which is caused when the contact tip 6 is brought into contact with the object to be measured 13.

According to the second embodiment, an illuminating system including a condensing lens 17, a half mirror 18, a light source 19, a photodetector 20, and the like, is additionally provided to the configuration of FIG. 1. The illuminating light H generated by the light source 19 passes through the half mirror 18 in the holding portion 9 and is condensed by the condensing lens 17. The illuminating light H is then reflected by a dichroic mirror 21 after being focused once, and then converted into parallel light beams by the objective lens 3 to be emitted therefrom. The dichroic mirror 21 has a property of allowing the laser beam G to pass therethrough while reflecting the illuminating light H. The contact tip 6 is illuminated with the illuminating light H, and the backscattered light from the contact tip 6 is condensed again in the objective lens 3 and reflected by the dichroic mirror 21. After that, the backscattered light of the illuminating light H passes through the condensing lens 17 to be reflected by the half mirror 18, and is detected by the photodetector (optical position sensing device) 20.

Even in the case of detecting the backscattered light of the illuminating light H, the incident intensity distribution with respect to the photodetector 20 varies along with the movement of the contact tip 6, and hence, as described above, the incident intensity distribution with respect to the photodetector 20 which varies at the same frequency as that of the vibration of the contact tip 6 may be obtained. At this time, a detection signal generated in the photodetector 20 may be subjected to lock-in detection by using a deflection frequency input to the acousto-optical deflector 2 as a reference frequency, so that optical detection may be performed excluding irrelevant information on items such as background light, other than information on the displacement of the contact tip 6.

In this embodiment, the contact tip 6 is illuminated with the illuminating light H, which is different in wavelength from the laser beam G (with, for example, long wavelength of equal to or larger than 1,000 nm in the infrared region) for vibrating the contact tip 6 by an optical radiation pressure, and the backscattered light from the contact tip 6 is detected. With this configuration, light with a wavelength (for example, short wavelength of equal to or smaller than 700 nm), which is different from that of the laser beam G for vibrating the contact tip 6, may be selected for use, making the measurement less susceptible to noise that appears when the light passes through an irradiation direction changer such as an acousto-optical device. Accordingly, as compared with a measuring apparatus with the configuration described in the first embodiment in which light for vibrating the contact tip 6 and light for detection are used in common, the displacement and the vibration of the contact tip 6 may be detected with higher sensitivity.

The present invention may be suitably applied, for example, to a highly accurate measurement of a three-dimensional shape which has a rectangular groove shape portion, such as a micromachine.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-207018, filed on Sep. 8, 2009, which is hereby incorporated by reference herein in its entirety.

What is claimed is:

1. A measuring apparatus for measuring a three-dimensional shape, comprising:
   a light source emitting light along an optical path;
   a contact tip that is brought into contact with an object to be measured and scans the object to be measured;
   a holding portion that is movable along the object to be measured;
   a coupling portion for coupling the contact tip to the holding portion via a flexible support member, the coupling portion having a flexible member through which passes light emitted from the light source, and a fixed member for supporting the flexible support member, with the fixed member having a light permeable region that overlaps with the optical path of the emitted light and through which the light passes;
   an objective lens supported by the holding portion;
   an optical system for condensing light provided by the light source on the contact tip via the objective lens;

a photodetector for receiving backscattered light from the contact tip and detecting a position of the contact tip that is brought into contact with the object to be measured;

a moving unit for moving the holding portion; and a position measuring instrument for measuring a position of the holding portion, the measuring apparatus measuring the three-dimensional shape by measuring the position of the holding portion while scanning the object to be measured with the contact tip that is brought into contact with the object to be measured, wherein the contact tip is provided with a film for reflecting the light condensed thereon.

2. The measuring apparatus according to claim 1, wherein the optical system includes a light beam direction changing unit for changing intensity and an irradiation direction of light in the optical system.

3. The measuring apparatus according to claim 1, wherein the photodetector receives backscattered light of light in the optical system, to thereby detect a displacement of the contact tip.

4. The measuring apparatus according to claim 1, further comprising an illuminating system for illuminating the contact tip with illuminating light that is different in wavelength from light in the optical system and condensing backscattered light of the illuminating light, wherein the photodetector detects the backscattered light of the illuminating light.

5. The measuring apparatus according to claim 4, wherein the light is condensed on a lower half of the contact tip and applies an optical radiation pressure to the contact tip.

6. The measuring apparatus according to claim 1, wherein a lower half of the contact tip is provided with the reflecting film.

7. The measuring apparatus according to claim 6, wherein chromium film is used as the reflecting film.

8. The measuring apparatus according to claim 1, wherein the coupling consists of only the flexible member and the fixed member.

9. The measuring apparatus according to claim 1, wherein the optical system generates optical radiation pressure that is applied to the contact tip.

* * * * *